United States Patent [19]

Ainslie et al.

[11] Patent Number: 4,799,946
[45] Date of Patent: Jan. 24, 1989

[54] PREPARATION OF GLASS FIBRE

[75] Inventors: Benjamin J. Ainslie; Susan P. Craig, both of Ipswich, England

[73] Assignee: British Telecommunications plc, London, England

[21] Appl. No.: 28,213

[22] Filed: Mar. 20, 1987

[30] Foreign Application Priority Data

Apr. 24, 1986 [GB] United Kingdom ................ 8610053

[51] Int. Cl.⁴ .......................................... C03B 37/018
[52] U.S. Cl. ..................................... 65/3.12; 65/18.2; 427/163
[58] Field of Search ...................... 65/3.11, 3.12, 18.2; 427/163

[56] References Cited

U.S. PATENT DOCUMENTS 3,864,113 2/1975 Dumbaugh ...................... 65/3.12 X
4,666,486 5/1987 Hutta .................................... 65/3.11

FOREIGN PATENT DOCUMENTS 8701110 2/1987 European Pat. Off. ............. 65/3.12

Primary Examiner—Robert L. Lindsay
Attorney, Agent, or Firm—Nixon & Vanderhye

[57] ABSTRACT

Rare earth elements, e.g. Nd, are introduced into optical glass fibre for telecommunications by evaporating a suitable salt, e.g. $NdCl_3$, from a glass sponge into the gas stream used to deposit core material. Preferred sponges are in the form of tubes having an outer impervious layer and an inner porous layer. These sponges are conveniently made by MCVD and the impregnation is preferably carried out using an alcoholic solution of the impregnant.

7 Claims, 1 Drawing Sheet

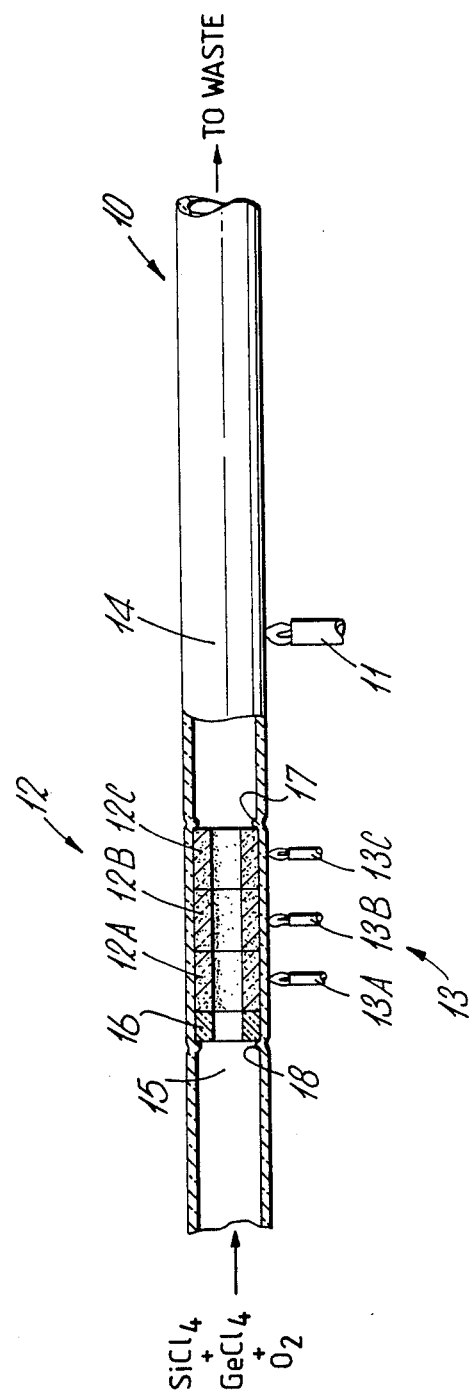

PREPARATION OF GLASS FIBRE

FIELD OF THE INVENTION

The invention relates to the preparation of glass fibre and in particular to the incorporation of dopants into multimode and monomode fibres suitable for telecommunications.

BACKGROUND AND SUMMARY OF THE INVENTION

The use of glass fibres for the transmission of telecommunications signals at wavelengths between 800 and 1600 nm is well established. It has also been proposed to utilise glass fibre as an active element, e.g. as a laser or amplifier. This requires the incorporation of dopants into the glass of which the fibre is made. For example, the incorporation of rare earths such as neodymium provides lasing properties.

Glass fibre is made by first preparing a precursor in the form of a thick rod having suitable composition gradients arranged in its cross section. The precursor is drawn into the fibre. One of the standard methods of making the precursor is known as MCVD or modified chemical vapour deposition. MCVD comprises passing suitable reactants, e.g. $SiCl_4$ and $O_2$, through the bore of a substrate tube, a small length of which is heated to reaction temperature. The heated segment moves along the length of the tube thereby depositing a thin layer of new glass on the inner wall. Many layers, e.g. 20 to 30, are usually deposited. The composition of each layer is individually controlled so that the cross-sectional composition of the ultimate fibre is also controlled. When enough layers have been deposited the tube is collapsed to a solid rod which is drawn into fibre.

MCVD is usually carried out with reactants which are volatile at room temperature, e.g. $SiCl_4$ (to provide the $SiO_2$ which is the major component of the ultimate fibre) and $GeCl_4$ (which provides the $GeO_2$ to adjust the refractive index). The rare earths are difficult to utilise in this process because they do not form suitable volatile compounds. A paper published by Poole, Payne and Fermann of Southampton University in "Electronics Letters" 15 Aug. 1985, Vol. 21, No. 17 describes a process in which Nd is introduced into MCVD by heating $NdCl_3$ to about 1000° C. Anhydrous $NdCl_3$ is deposited near the inlet of the substrate tube (but outside the deposition zone). When Nd is required, the deposit is heated to a suitable temperature, e.g. 1000° C., using a second burner (the first burner heats the moving segment of the deposition zone).

It has been shown that this technique is effective for incorporating Nd into an optical fibre but the process is too variable and it lacks sufficient control. This invention relates to a new source which facilitates control and thereby provides more consistent products.

The new source takes the form of an inert, solid, porous sponge which is impregnated with a metal compound, preferably involatile at temperatures below 100° C., e.g. a salt of a rare earth metal such as a neodymium or erbium salt. In use, the sponge is placed in the substrate tube upstream of the deposition zone and heated to volatilise the impregnant into the reactant stream.

The incorporation of suitable levels of dopants into the tube is achieved with low concentrations of the metal compound in the reactant gas stream of the MCVD, e.g. concentrations as low as 0.01% molar. Since the source can be heated to 1000° C. or even higher, e.g. the melting point of silica, many metal compounds can be used as the source. For example, there are many metal salts and other compounds giving partial vapour pressures of approximately 0.1 or greater Torr at 1000° C. Thus the chlorides are particularly suitable as impregnants because they are usually the most volatile salt and other chlorides, e.g. $SiCl_4$ and $GeCl_4$, are present in the system.

The most suitable configuration for the sponge is a tube, preferably with an outer impervious layer and an inner porous layer so that volatilised impregnant is preferentially directed into the bore. The tubular configuration allows the reaction gas to pass through the bore and the impregnant is volatilised from the porous layer into the gas stream flowing through the bore. This arrangement has minimal effect on the reactant gas used for MCVD.

A sponge must be impregnated before it can be used. The impregnation can be conveniently achieved by soaking the sponge in a low surface tension solution of the impregnant, until the solution percolates throughout all the pores. After the saturation the sponge is removed from the solution and dried by heating, e.g. at 120° C. to 500°, preferably in an atmosphere of chlorine diluted with an inert gas such as He. The chlorine assists drying and, when the impregnant is a chloride, the chlorine may also reduce the amount of decomposition.

Sponges of this nature are conveniently prepared by MCVD deposition of porous pure $SiO_2$ on a suitable substrate tube. After impregnation a long tube can be cut into many, e.g. 30 to 60, segments. This produces the individual sources which are used once only.

The process of the invention can be used to incorporate a plurality of rare earths. This is preferably done by employing a plurality of sponges, each impregnated with a salt of only one rare earth. The sponge can be impegnated with a mixture of several salts but this limits the control of the ratios of the various additives.

It should be realised that the amount of impregnant in the sponge does not exert a major control on the concentration thereof passed into the process (because the concentration of a solid is constant provided it is present). Thus the depletion of the sponge during use does not cause unacceptable variations of concentration. Control is achieved by using higher temperatures to volatilise the impregnant at a higher rate. The length of a sponge may also have an effect because a larger surface tends to evaporate impregnant at a higher rate.

BRIEF DESCRIPTION OF THE DRAWING

The invention will now be described by way of example with reference to the accompanying drawing which illustrates, diagramatically, MCVD in accordance with the invention.

DETAILED DESCRIPTION

The FIGURE illustrates a conventional MCVD process in which a substrate tube 10 is rotated in a glass blowing lathe (not shown) and a reactant gas, e.g. a mixture of $SiCl_4 + GeCl_4 + O_2$, is passed through its bore. A short segment of the tube, about 2 cm long, is heated to about 1600° C. by travelling flame 11. In the segment the chlorides are converted into oxides which deposit downstream of the flame 11. As the flame traverses the deposit fuses to form a thin layer on the inner surface of the substrate.

Upstream of the deposition zone 14, the substrate tube 10 is formed into a source chamber 15 which contains three tubular glass sponges 12A, 12B and 12C each impregnated with a chloride of a different rare earth metal.

Independent heaters 13A, 13B and 13C are associated with the sponges 12A, 12B and 12C. Turning on one or more of burners 13 volatilises the equivalent rare earth into the reactant stream whereby it or they become(s) incorporated into the layer. The hotter the burner 13 the more rare earth is incorporated.

In addition to the sponges 12 the source chamber also contains a glass spacer ring 16. The outside diameters of the sponges 13 and the spacer 15 provide a sliding fit into the source chamber 15. Dimples 17 are provided to prevent the sponges sliding too far onto the tube during loading. After loading dimples 18 are formed to restrict axial movement. (Spacer ring 16 prevents the sponges being heated when dimples 18 are formed).

A specific preparation, using the technique illustrated above, will now be described. This description will be dividied into three parts, namely:

(I) Use of MCVD to make a spongy deposit of $SiO_2$ on the inside surface of an impervious tube.
(II) The impregnation of the deposit.
(III) The preparation, according to the invention, of monomode fibre by MCVD using a sponge.

(I) Deposition

The substrate, upon which the spongy layer was deposited, was a silica tube with outside diameter 18 mm and inside diameter 15 mm. The actual workpiece on which deposition occurred was 1000 mm long with extensions to clamp into a glass blower's lathe. Using a gas flow which contained $SiCl_4$ 60 ml/min and oxygen 1.5 liter/min, 10 layers of $SiO_2$ were depositioned on the inner surface of the workpiece. The temperature was high enough for the reaction $$SiCl_4 + O_2 = SiO_2 + 2Cl_2$$

to occur but not high enough to sinter the deposited silica. The final result was a spongy layer with a density of about 0.5 g/cc. The workpiece (1000 mm long) was detached from the extensions. Many workpieces were prepared using this technique.

(II) Impregnation

Each workpiece was soaked for about 2 hours in 0.1M solution of impregnant in absolute ethanol. After draining, the workpiece was dried in an oven at 90° C. for about 1 hour and cut in 40 sponges each 25 mm long. (Because they are made together the sponges tend to be alike and one or two can be used for calibration if desired). The original substrate constitutes the outer impervious layer and the deposit constitutes the porous layer of the sponge. In separate experiments, both $NdCl_3.6H_2O$ and $ErCl_3.6H_2O$ were used as impregnant.

(III) Fibre Preparation

One sponge 12 and a spacer ring 16 were loaded into a substrate tube which was mounted into a glass blower's lathe as shown in the drawing. As there was only one sponge 12 there was only one burner 13.

Fibre preparation comprised stage a to e as follows:

(a) Drying

The sponge had been impregnated with a compound containing water of crystallisation in step (II) and this was removed as a preliminary step by heating at about 400° C. for half-an-hour in a stream of $He/Cl_2$ (He 1.5 l/min; $Cl_2$ 300 ml/min).

(b) ETCH

To clean its surface, the substrate was etched with fluorine. The fluorine source was $CCl_2F_2$ at 16 ml/min in $O_2$ at 150 ml/min. (This technique is described, inter alia, in GB No. 2084988A).

(c) Cladding Depositon 15 layers of P/F-doped $SiO_2$ were deposited in accordance with normal practice. After deposition of the cladding layers the tube was heated for 5 mins in an atmosphere which contained chlorine ($Cl_2$, 300 ml/min: He, 1.5 l/min at 400° C.)

(d) Core Deposition

The core comprised two layers of $SiO_2$ doped with $GeO_2$, phosphorus and the metal of the impregnant. Liquid sources were used at the following rates:

|  | mls per minute |
|---|---|
| $SiCl_4$ | 55 |
| $GeCl_4$ | 12 |
| $POCl_3$ | 0.6 |

The oxygen rate was 1.5 l/min and the sponge (12 in the drawing) was heated to about 900° C.

(e) Sinter and Collapse

Finally the core was sintered and conventionally collapsed to a preform which was free from visible scattering centres. After optical analysis, the preform was conventionally drawn into the fibre.

This technique was used to make Nd-doped fibre with a variety of core glass compositions. Thus core compositions covering the ranges 3 to 40 mole % of $GeO_2$ and 0 to 2 mole % of $P_2O_5$ were prepared.

Analysis confirmed that Nd had been incorporated into the core of the fibres. It was noted that both absorption and fluorescence spectra were slightly dependant on the phosphorus content.

The technique was also used to make Er doped fibre and fibres with the following properties were prepared.

| Cladding type | $SiO_2/P_2O_5/F$ |
|---|---|
| Core type | $SiO_2/GeO_2$ |
| Core diameter | 2.9 μm |
| Delta index | 0.036 |
| Er concentrations | from 100 ppm to 1% mole. |

[Note. It may be convenient ot use a small core diameter in order to help achieve high radiation densities. A high delta index may be needed to compensate for the small core and to maintain guidance at 1.5 to 1.6 μm. A high delta index can be achieved using high, eg 30–40%, concentrations of $GeO_2$ in the core "Delta index" means the refractive index of the core minus the refractive index of the cladding].

A length, about 1 m, of fibre was provided with dielectric mirrors, approximately 98% reflectivity, at each end. The fibre was pumped with radiation of 804 nm and approximately 3 mW of power was absorbed. Lasing activity at 1.54 μm was observed.

Another length, about 2 m, was assessed as an optical amplifier. The fibre was pumped with 1 watt of radiation at 656 nm. A signal of 1.535 μm was amplified with a gain of 22 dB.

The method of this invention can also be used to incorporate metal additives into any or all of the MCVD layers. Thus it can be used to confer energy absorption properties on the outer layers of the cladding.

We claim:

1. A method of making a source for providing metal compounds into MCVD, which method comprises:

(i) depositing a porous silica layer on the inner surface of a substrate tube by MCVD, said MCVD being performed at a temperature below the sintering temperature of the deposited silica, (ii) soaking the product of the MCVD in a solution of a metal compound; and (iii) evaporating the solvent of the solution whereby the porous layer is impregnated with the metal compound.

2. A method according to claim 1, wherein the solution comprises the metal compound dissolved in an alcohol.

3. A method according to claim 2, wherein the solute is $NdCl_3.6H_2O$ or $ErCl_3.CH_2O$.

4. A method of preparing a precursor of optical fibre for telecommunications which comprises depositing a plurality of glass layers on the inner surface of a substrate tube by MCVD and thereafter collapsing the tube to a solid rod, wherein the deposition is carried out with a source that provides one or more metal compounds into MCVD, said source comprising an inert, solid, porous sponge impregnated with at least one metal compound and being located in the substrate tube upstream of the deposition zone and wherein said source is heated to volatilise impregnant into the reaction gases during the deposition of the core.

5. A method of preparing glass fibre which comprises making a precursor according to claim 4 and then drawing the precursor into the fibre.

6. A method of preparing a precursor of optical fibre for telecommunications which comprises depositing a plurality of glass layers on the inner surface of a substrate tube by MCVD and thereafter collapsing the tube to a solid rod, wherein the deposition is carried out with a source that provides one or more metal compounds into the MCVD, said source comprising an inert, solid porous sponge impregnated with at least one metal compound and being located in the substrate tube upstream of the deposition zone and that said source is heated to volatilise impregnant into the reaction gases during the deposition of selected layers.

7. A method of preparing glass fibre which comprises making a precursor according to claim 6 and then drawing the precursor into the fibre.

* * * * *